US011881735B2

(12) United States Patent
Arvind et al.

(10) Patent No.: US 11,881,735 B2
(45) Date of Patent: Jan. 23, 2024

(54) INTEGRATION OF SECOND-USE OF LI-ION BATTERIES IN POWER GENERATION

(71) Applicant: Cummins Inc., Columbus, IN (US)

(72) Inventors: V. Ramya Arvind, Columbus, IN (US); Alyssa Marlenee Jenkins, Duluth, MN (US)

(73) Assignee: CUMMINS INC., Columbus, IN (US)

( * ) Notice: Subject to any disclaimer, the term of this patent is extended or adjusted under 35 U.S.C. 154(b) by 675 days.

(21) Appl. No.: 17/051,389

(22) PCT Filed: Jul. 11, 2019

(86) PCT No.: PCT/US2019/041391
§ 371 (c)(1),
(2) Date: Oct. 28, 2020

(87) PCT Pub. No.: WO2020/014474
PCT Pub. Date: Jan. 16, 2020

(65) Prior Publication Data
US 2021/0050729 A1  Feb. 18, 2021

(30) Foreign Application Priority Data
Jul. 11, 2018 (IN) .............................. 201811025958

(51) Int. Cl.
H02J 7/00 (2006.01)
H01M 10/42 (2006.01)
H01M 10/48 (2006.01)

(52) U.S. Cl.
CPC ........... *H02J 7/005* (2020.01); *H01M 10/425* (2013.01); *H02J 7/0013* (2013.01); *H02J 7/0048* (2020.01);
(Continued)

(58) Field of Classification Search
USPC ....................................................... 320/134
See application file for complete search history.

(56) References Cited

U.S. PATENT DOCUMENTS 6,924,567 B2  8/2005 Killian et al.
6,936,371 B2  8/2005 Komori et al.
(Continued)

FOREIGN PATENT DOCUMENTS

JP  2017-531983 A  10/2017
WO  2013/038458 A1  3/2013

OTHER PUBLICATIONS

International Preliminary Report on Patentability received for PCT Patent Application No. PCT/US2019/041391, dated Jan. 21, 2021, 7 pages.
(Continued)

*Primary Examiner* — Mohammed Alam
(74) *Attorney, Agent, or Firm* — Faegre Drinker Biddle & Reath LLP

(57) ABSTRACT

A method of managing second use batteries incudes communicating an external load demand to battery management modules (BMMs) of first use batteries and second use batteries; communicating, by each of the BMMs, the state of health (SoH) of the respective first or second use battery to the other BMMs; by the BMMs of the first use batteries with highest SoH, engaging the first use batteries to meet the external load demand, wherein the highest SoH is determined by the BMMs by ranking the SoH of each battery relative to the other batteries; and by the BMMs of the second use batteries, setting a discharge limit for each of the second use batteries based on the SoH of the respective second use battery, and controlling the second use batteries to supply currents not to exceed the discharge limits of the respective second use batteries to load-share with the first use batteries.

17 Claims, 11 Drawing Sheets

(52) U.S. Cl.
CPC ..... *H02J 7/007188* (2020.01); *H01M 10/482* (2013.01); *H01M 2010/4271* (2013.01)

(56) References Cited

U.S. PATENT DOCUMENTS

| | | | |
|---|---|---|---|
| 8,362,643 | B2 | 1/2013 | Luo et al. |
| 8,362,749 | B2 | 1/2013 | Komori et al. |
| 8,742,723 | B2 | 6/2014 | Okumura et al. |
| 9,079,505 | B1 | 7/2015 | Hyde et al. |
| 9,118,198 | B2 | 8/2015 | Naskali et al. |
| 9,302,592 | B2 | 4/2016 | Lin et al. |
| 9,406,982 | B2 | 8/2016 | Obata |
| 9,791,514 | B2 | 10/2017 | Nishizawa |
| 2007/0108946 | A1 | 5/2007 | Yamauchi et al. |
| 2011/0260779 | A1 | 10/2011 | Liu |
| 2012/0068715 | A1 | 3/2012 | Martaeng |
| 2012/0248868 | A1 | 10/2012 | Mobin et al. |
| 2013/0179061 | A1* | 7/2013 | Gadh ................ B60L 53/305 701/1 |
| 2013/0181680 | A1 | 7/2013 | Chua |
| 2013/0320772 | A1 | 12/2013 | Qiao et al. |
| 2014/0287278 | A1* | 9/2014 | Despesse ............ H01M 50/213 429/50 |
| 2014/0312828 | A1* | 10/2014 | Vo .................... H02J 7/0016 429/7 |
| 2016/0079755 | A1 | 3/2016 | Triebel et al. |
| 2016/0105042 | A1 | 4/2016 | Taylor et al. |
| 2016/0162849 | A1 | 6/2016 | Matsuyama et al. |
| 2016/0226268 | A1* | 8/2016 | Okui ..................... H02J 7/0071 |
| 2016/0298589 | A1* | 10/2016 | Setterberg ............ H02J 7/1423 |
| 2016/0325638 | A1 | 11/2016 | Dai |
| 2017/0054306 | A1* | 2/2017 | Vo ..................... H02J 7/0024 |
| 2017/0104346 | A1* | 4/2017 | Wenzel ............ H02J 13/00028 |
| 2017/0115356 | A1 | 4/2017 | Fetzer et al. |
| 2017/0271891 | A1 | 9/2017 | Keates |
| 2017/0324256 | A1 | 11/2017 | McMorrow et al. |

OTHER PUBLICATIONS

International Search Report and Written Opinion issued by the ISA/US, Commissioner for Patents, dated Nov. 14, 2019, for International Application No. PCT/US2019/041391; 9 pages.

* cited by examiner

US 11,881,735 B2

INTEGRATION OF SECOND-USE OF LI-ION BATTERIES IN POWER GENERATION

CROSS-REFERENCE TO RELATED APPLICATIONS

The present application is a National Stage Entry under Title 35, U.S.C. § 371, of International Patent Application No. PCT/US2019/041391, filed on Jul. 11, 2019, which claims the benefit of Indian Application No: 201811025958, filed on Jul. 11, 2018, both applications are incorporated by reference herein in their entirety.

TECHNICAL FIELD

The present disclosure relates to use of batteries in second use applications, and more particularly to methods and systems for using batteries in second use applications.

BACKGROUND OF THE DISCLOSURE

Plug-in Hybrid Electric/Electric Vehicles (PHEV/EV) use batteries designed to energize the vehicle to enable travel for a predetermined distance. As the batteries age they are unable to satisfy the distance criteria and are swapped for new batteries. Typically batteries degraded to 70-80% of their original capacity are swapped out of the vehicle. Used batteries may be recycled. However used batteries can also be used in so called "second-use" applications, which are any applications in which swapped, or second use, batteries can be used. Second use applications include power generation systems including commercial and industrial stand-by applications, micro-grid and distributed power generation applications, among others.

Landfilling lithium ion batteries is illegal most places and not economic anywhere. Recycling them, at least given today's recycling capabilities, is effectively down-cycling and is relatively expensive.

Used batteries have lower energy density than new stationary-storage batteries and will not last as long, since they are nearer the end of their lifecycle.

Most vexingly, EV batteries vary wildly. Not only do they have different sizes, shapes, and performance characteristics when new, but they have been used differently, in different climates, under different stressors, in different cars. Batteries that have experienced different environments and use cycles will have different degradation trajectories.

However, degradation of second use batteries is of concern. Another concern in power generation systems is the duty-cycle and fuel efficiency of electromechanical generators used to re-charge the batteries or power the load. Better systems are needed to extend the life of second use batteries and electromechanical generators while satisfying the load demands in a cost efficient manner.

SUMMARY

Embodiments of a method of using second use batteries are provided herein. In some embodiments, the method comprises communicating an external load demand to battery management modules (BMMs) of first use batteries and second use batteries; communicating, by each of the BMMs, the state of health (SoH) of the respective first use battery or second use battery to the other BMMs; by the BMMs of the first use batteries with highest SoH, engaging the first use batteries to meet the external load demand, wherein the highest SoH is determined by the BMMs by ranking the SoH of each battery relative to the other batteries; and by the BMMs of the second use batteries, setting a discharge limit for each of the second use batteries based on the SoH of the respective second use battery, and controlling the second use batteries to supply currents not to exceed the discharge limits of the respective second use batteries to load-share with the first use batteries.

In some embodiments a battery management system is provided, comprising: a plurality of battery management modules (BMMs) communicatively coupled to each other to receive an indication of an external load demand and to respective first use batteries and second use batteries; each of the plurality of BMMs including a controller configured to transmit, to the other of the plurality of BMMs, a state of health (SoH) of a first use battery or second use battery connected to the BMM; wherein the controller is configured to determine, from among a plurality of BMMs based on respective states of health (SoH) of the batteries connected to the BMMs, if the battery connected to the BMM has a higher SoH than other batteries connected to the other of the plurality of BMMs and if so, to engage the battery to supply power to the external load demand.

In some embodiments the method comprises determining a state of health (SoH) of a battery based on SoH parameters; comparing the SoH parameters to a plurality of SoH profiles to identify a SoH profile from the plurality of SoH profiles; estimating a remaining life of the battery based on the SoH profile; determining, based on the remaining life of the battery, a depth of discharge (DOD) and state of charge (SoC) of the battery; setting a threshold based on the remaining life of the battery; and characterizing the battery as a first use battery if a discharge time, a discharge rate, the DOD, and the SoH of the battery exceed the threshold and as a second use battery otherwise.

BRIEF DESCRIPTION OF THE DRAWINGS

In the drawings, corresponding reference characters indicate corresponding parts throughout the several views. Unless stated otherwise the drawings are not proportional.

DETAILED DESCRIPTION

Figure 1:
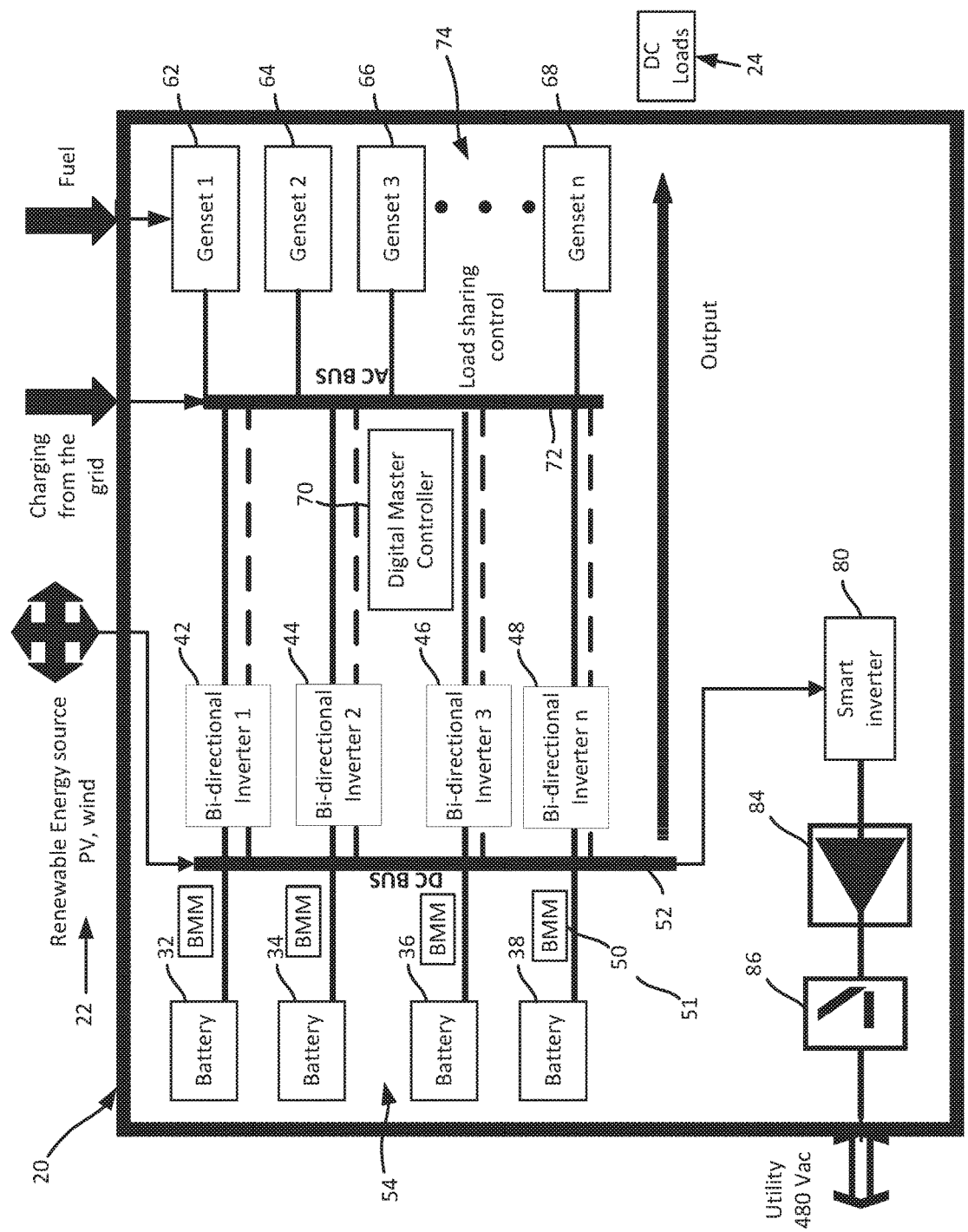
FIG. 1 is a block diagram of an embodiment of a power storage system.

One object of the invention is to integrate second use batteries in power systems to improve the overall cost effectiveness of the power systems. Cost effectiveness improves by use of second use batteries, management of second use batteries to extend their useful life, management of electromechanical generators to extend their useful life power, and management of fuel provided to run the electromechanical generators in novel ways described below.

Integration of first and second use batteries can occur under different circumstances. For example, in a stationary application, a customer may choose to upgrade an existing system by adding newer batteries and inverters to existing ones that are partially degraded. Or perhaps the batteries resided in a location that flooded and some batteries must be replaced but not others. Or, if the batteries are semi-portable modular units (e.g. rental or military markets), the containers could get mix-and-matched and each may have aged differently due to use the case or environmental conditions to which they were exposed. The existing batteries that were not initially used in electric vehicle applications are considered second use anyway if they their capacity has degraded to 70-80% of the original capacity.

Battery life or remaining life is a measure of battery performance and longevity, which can be quantified in several ways: as run time on a full charge, as estimated by a manufacturer in ampere-hours, or as the number of charge cycles until the end of useful life. For lithium-ion batteries cycling, elevated temperature, and aging decrease performance over time.

Discharge time is the Ah rating divided by the current, which is based on the load. The charge time depends on the battery chemistry and the charge current. For NiMh, for example, the charge time is typically 10% of the Ah rating for 10 hours. Li-Ion can typically be charged at the C/1 rate to about 75% capacity and then at a reduced rate for the balance.

State of health (SoH) is a figure of merit of the condition of a battery compared to its ideal conditions measured as percent points. SoH can be used to estimate the battery's useful lifetime or remaining life in a particular application. Capacity is a health indicator. Although a battery should deliver 100% of specified capacity during the first year of service, it is common to see lower than specified capacities. Internal resistance and self-discharge may be used as health indicators in combination with capacity. Voltage, ability to accept a charge, and the number of charge/discharge cycles can also be used by a battery management module or system to derive SoH. Arbitrary weights can be applied to each parameter's point value. The SoH threshold below which an application deems a particular battery unsuitable is arbitrary. An application may accept a battery with a SoH of 50% and above, while a more critical application may only accept batteries with a SoH of 90% and above.

Cycling may reduce the original capacity up to more than 20%. State of Charge (SOC)(%) represents the present battery capacity relative to the available capacity, which can be the original capacity or the degraded capacity. SOC is generally calculated using current integration to determine the change in battery capacity over time. Depth of Discharge (DOD)(%) represents the percentage of the present battery capacity that has been discharged. A discharge to at least 80% DOD is referred to as a deep discharge.

Second use batteries, for example second use Li-ion batteries, can be integrated into power systems for commercial/industrial stand-by applications or in micro-grid/distributed power generation applications in novel integrating ways are described below with reference to specific embodiments in connection with the figures. Batteries may be diagnosed before they are added to the system to determine if they are first or second use batteries. Diagnosis may determine the SoH and DOD of the added battery and is performed because the origin and use history of the battery being added to the system may be unknown. Second use batteries are used to supplement first use battery capacity. In some variations, thresholds are used to minimize cycling of the second use batteries thereby extending their life. When the aggregate (first and second use batteries) battery capacity is insufficient to satisfy a total demand, power generators are engaged to add electrical energy to the system, thus meeting the external load demand and recharging the batteries. In some variations, thresholds are used to minimize cycling of the power generators thereby extending their life.

Several practices can mitigate degradation of Li-ion batteries. Partial-discharge cycles, in the order of less than 30% of battery capacity, can extend battery life. Keeping the battery fully charged can shorten its life. Charging below 0° C. or above 40° C. can decrease battery life, as can high charge and discharge currents and very deep discharges. Charging at a constant rate and then reducing the rate when the voltage reaches a float voltage increases battery life. The float voltage can be set to prevent charging the batteries to 100% capacity.

Second use Li-ion batteries may be paralleled with newer Li-ion batteries. It should be noted that "battery" refers to any combination of battery cells. A battery also refers to a battery pack or a rack mounted battery pack. The bi-directional inverter coupled to each battery effects charging and discharging. Bi-directional inverters are sized based on the state of health and charging/discharge threshold determined.

In some embodiments, the power system comprises driven power sources that supply three-phase power and a power transmission network to transfer power from the power sources to the load. The load may be a device that requires uninterrupted power to operate, for example lights, motors, power supplies and appliances such as refrigerators. The driven power sources, referred to as gensets, comprise a fuel consuming engine rotating an electrical machine configured to induce electrical energy and generally referred to as a generator or alternator.

The charging/discharging cycle of the batteries is triggered to recharge the batteries and, if necessary, to supply electrical energy to the load. In the latter case, the gensets must be capable of satisfying the external load demand plus the charging demand. As indicated previously, Li-ion batteries are preferably charged at a fast rate when they are below 30% DOD and at a slow rate as they approach full charge. The slow rate may be constant or decrease as the battery approaches full charge. Charging at the slow rate extends battery life. In some examples, the gensets are engaged to prevent that the batteries are discharged more than a predetermined DOD.

In some variations, a discharge threshold is set to determine when to engage the gensets. In one example, the discharge threshold is compared to the aggregate SOC of a first group of batteries, comprising only first use batteries, and when the aggregate SOC equals the discharge threshold the gensets begin to operate to add electrical energy to the system. The electrical energy supplied by the gensets should exceed the external load demand, with the excess energy provided to charge the batteries.

In some variations, battery selection to power the external load differentiates on charge/discharge rate for the purpose of preserving the SoH of the second use batteries. In one example, first use batteries, or batteries with SoH higher than a SoH threshold, are engaged to supply energy to compensate for transient load conditions, in which either the load increases (or decreases) rapidly or by an amount greater than a threshold, and second use batteries are only engaged in steady state load conditions. By engaging the second use batteries only in steady state load conditions the rate of discharge can be relatively low, thereby extending the life of the second use batteries beyond what it would be if the rate of discharge were higher. Furthermore, discharging second use batteries at a low discharge rate reduces cycling, which also extends their life. In another example, second use batteries are sufficiently large that they are used with first use batteries to supply energy to compensate for transient load conditions. For instance, if a second use battery has a capacity that is a multiple of a first use battery, e.g. 5×, then even at a low discharge rate (as a percent of capacity) the second use battery may output as much current as the first use battery.

First and second use batteries may be engaged in different modes of operation to achieve the objects of the invention. IN A FIRST MODE OF OPERATION, first and second use batteries are engaged to supply the external load. In one example, the first mode of operation is employed when the external load is low enough that operating the gensets, or an additional one, would be fuel inefficient. For example, the first group of batteries may be engaged when the external load is less than an inefficiency threshold based of the capacity of a genset. The inefficiency threshold may be, for example, 30%. Thus if the external load is less than the inefficiency threshold, or less than an integer plus the inefficiency threshold, then the first use batteries are engaged to avoid inefficient use of a genset or avoid use of an additional genset, thus saving fuel. In the first mode of operation the external load is in a steady state.

IN A SECOND MODE OF OPERATION, first use batteries are engaged to supply the external load when the external load is transient and increasing, during which time the second use batteries may or may not be engaged. The first use batteries may supplement power from the gensets as the load increases. Increasing load without batteries to compensate causes the gensets to slow down, perhaps into an inefficient area. Adding the capacity of one or more first use batteries maintains the gensets in the efficient area of operation. As the gensets speed-up to absorb the additional load the first use batteries may gradually supply less energy and eventually disengage. Thusly, the faster energy supply response of the first use batteries helps improve the fuel efficiency of the gensets. If the second use batteries were engaged, they may remain engaged but the current supplied by them will be maintained at or below a discharge rate limit selected to preserve the SoH of the batteries, as described below.

IN A THIRD MODE OF OPERATION, first use batteries are engaged to supply the external load when the external load is transient and decreasing, during which time the second use batteries may or may not be engaged. The first use batteries may supplement power from the gensets as the load decreases, to enable one or more gensets to be disengaged. The first use batteries compensate for the reduction caused by disengagement of one or more gensets.

The gensets must be controlled. In one variation, controlling the gensets includes estimating the conditions for running the engines to charge the batteries and supply the external load, considering fuel economy, the life to overhaul of the gensets and reducing the start/stop frequencies to increase the life to overhaul, and estimating based on the historic duty cycle of the gensets charging the batteries according to an anticipated load.

IN A FOURTH MODE OF OPERATION, a master controller provides signals to the gensets, to engage the gensets when the aggregate SOC of the first use batteries is less than or equal to the discharge threshold. The gensets may be engaged, assuming the external load demand remains, until the aggregate SOC rises to 90%.

IN A FIFTH MODE OF OPERATION, the gensets are engaged to supply energy to the external load and charging of the first and second use batteries increases the load on the gensets to cause them to operate in a more efficient range. The fuel efficient rate may be based on a fuel map. For example, it may be inefficient for the combustion engines of the gensets to operate below 30% load. Charging of the batteries may suffice to increase the load from below 30% to above 30%. A genset may be disengaged to increase the load on the remaining gensets. In that case it may be appropriate to stop charging the first use batteries to enable disengaging a genset so as to enable the remaining gensets to supply the external load, if charging the first use batteries would exceed the capacity of the remaining gensets. In some embodiments, a battery management module provides a signal to the gensets to engage the gensets when the aggregate SoH is 20%. The gensets are engaged until the SoH rises to 90%.

The foregoing embodiments, variations thereof, and examples, and additional ones, will now be described with reference to the figures. FIG. 1 is a block diagram of an embodiment of a power system 20 which may receive resources 22 such as electrical energy, from a power grid or renewable resources, and fuel to run electromechanical generators, to power a load 24. Power system 20 includes several batteries 32-38 and inverters 42-48. Each battery is communicatively coupled to a battery management module (BMM) 50 to supply DC electricity to a DC bus. BMM 50 comprises (not shown) a processor 96 and memory 98 comprising processing instructions structured to control inverters 42-48 to charge or discharge batteries 32-38. In combination these components of power system 20 may be referred to as the energy storage subsystem 54. BMMs can be housed individually or together to form a battery management system 51. Such processing instructions comprise instructions configured to implement the methods described herein, including at least in part the methods described with reference to FIGS. 2-5 and 8-10.

Power system 20 also includes several electromechanical generators, also referred to as driven power sources and gensets 62-68 communicatively coupled to a master controller 70 structured to cause gensets 62-68, or any of them, to operate so as to supply AC energy to an AC bus 72. In combination these components of power system 20 may be referred to as the AC subsystem 74. AC subsystem 74 may comprise generator sets, transfer switches, digital master controls complete with integrated switchgear and remote monitoring controls in a single integrated control system that can directly operate the engine fuel system in conjunction with an engine control unit where appropriate, directly control the alternator excitation system and provide other control functions that increase reliability. Operating over a broad bus voltage and frequency operating range, the generator set governing controls are temperature dynamic, automatically adjusting governing characteristics to account for changes in engine operating temperature. This enables the system to synchronize even in the event of instability on the bus or abnormal frequency conditions system. Digital paralleling only requires one digital master controller, regardless of the number of paralleled generator sets, reduces the 'footprint' of the control modules of each generator set in addition to centralizing information and control into one input/output device. Additional details pertaining to a master controller, bi-directional inverters, and gensets are disclosed in U.S. Pat. No. 9,780,567, issued Oct. 3, 2017, and U.S. Pat. No. 812,866, issued Nov. 7, 2017, which are incorporated by reference herein in their entirety.

A smart inverter 80 may be provided to couple DC bus 52 to a transformer 84 and a transfer switch 86 to supply energy from DC bus 52 to the utility grid. DC bus 52 may also be coupled directly to DC loads 24. Inverters 42-48 may be coupled to AC bus 72 thus coupled to gensets 62-68 in a parallel arrangement. As used herein an inverter is a device that is used to convert a DC voltage to an AC voltage, and a converter is a device that is used to convert AC voltage to DC voltage. Inverters include controls and power modules, as is well known in the art, which utilize pulse-width-modulation (PWM) logic to control the gates of power devices to generate AC voltages of desired amplitude and frequency. Converters may be static, comprising rectifiers, or dynamic, comprising power modules gated to generate DC voltages of desired amplitude.

As described below, battery management logic and generator management logic are configured to control operation of the batteries, which include first and second use batteries, and the gensets, to satisfy the objects of the invention. The term "logic" as used herein includes software and/or firmware comprising processing instructions executing on one or more programmable processors, application-specific integrated circuits, field-programmable gate arrays, digital signal processors, hardwired logic, or combinations thereof, which may referred to as "controllers". Therefore, in accordance with the embodiments, various logic may be implemented in any appropriate fashion and would remain in accordance with the embodiments herein disclosed. A non-transitory machine-readable medium comprising logic can additionally be considered to be embodied within any tangible form of a computer-readable carrier, such as solid-state memory, magnetic disk, and optical disk containing an appropriate set of computer instructions and data structures that would cause a processor to carry out the techniques described herein. A non-transitory computer-readable medium, or memory, may include random access memory (RAM), read-only memory (ROM), erasable programmable read-only memory (e.g., EPROM, EEPROM, or Flash memory), or any other tangible medium capable of storing information.

Figure 1A:
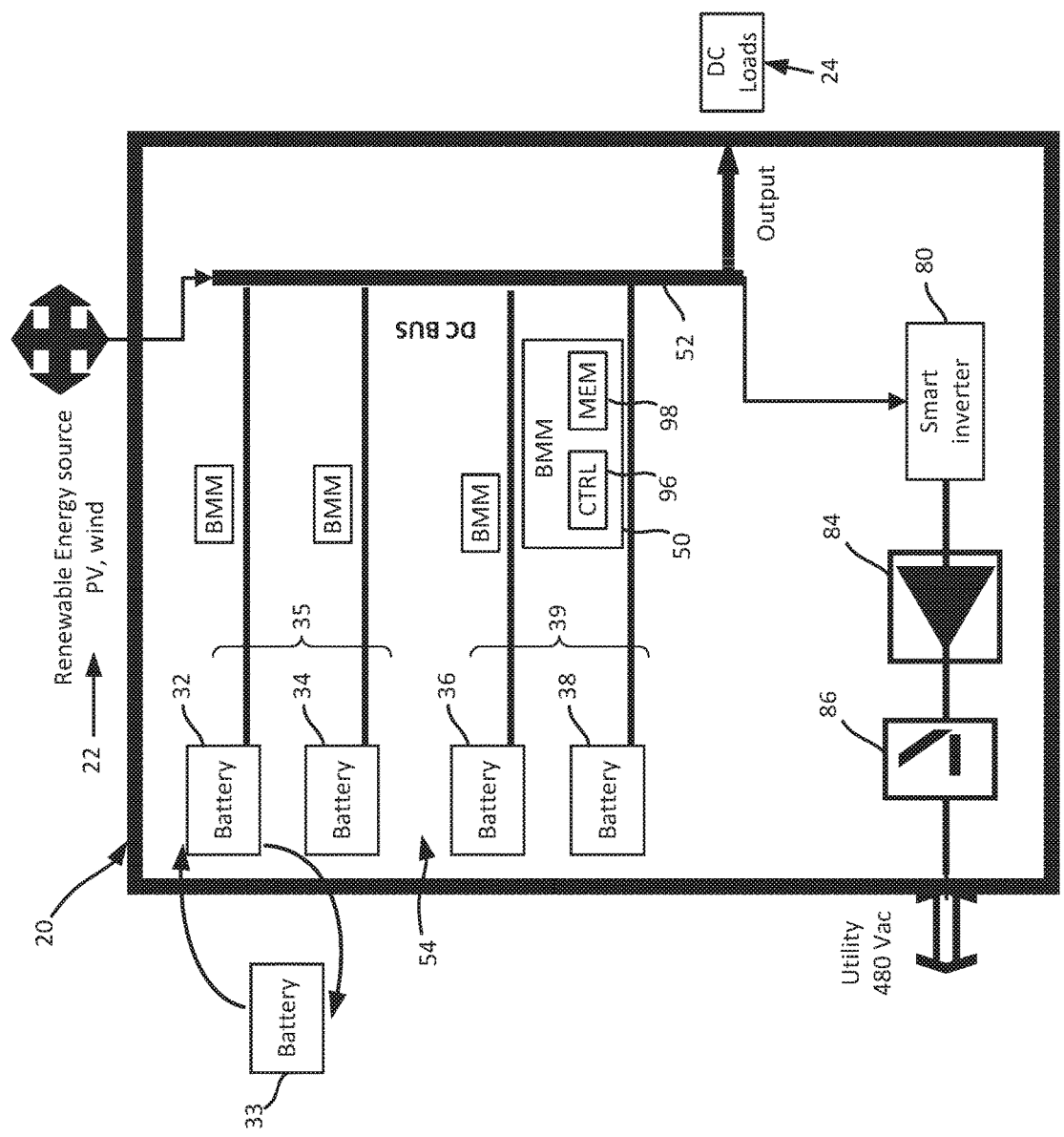
FIG. 1A is a block diagram of a section of the embodiment of a power storage system of FIG. 1.

FIG. 1A is a block diagram of a portion of the embodiment of power system 20 described with reference to FIG. 1. As shown in FIG. 1A, an external load demand is communicated to BMMs 50 of first use batteries 35 and second use batteries 39. In the present example, batteries 32 and 34 are designated as first use batteries and batteries 36 and 38 are designated as second use batteries 39. The designation is illustrative. A battery 33 is also shown, illustratively a replacement battery. Battery 33 could also be an additional battery, in which case a BMM 50 may be added to monitor it and conduct a battery diagnostics test to determine its SoH and characterize it as a first use or second use battery.

In some variations, a method of using the second use batteries includes determining the predefined battery discharging time period. The determination is made by calculating the peak-power and continuous power demand the batteries can support, calculating the power threshold of the batteries to reduce the charge/discharge cycling of the batteries, and controlling the cycling without active temperature control and within a predetermined temperature range. In one example, the power threshold is determined to set a life-extending discharge rate limit and minimize cycling.

In some variations, a monitor system controls bi-directional inverters to transmit power from second use Li-ion batteries to the load until when doing so would exceed the determined power threshold. In some variations, a monitor system controls bi-directional inverters to transmit power from second use Li-ion batteries to the load until when doing so would exceed the determined power threshold. In other variations, a distributed control system is employed to control bi-directional inverters to transmit power from second use Li-ion batteries to the load until when doing so would exceed the determined power threshold. In the distributed system BMMs control the inverters. Each BMM receives demand information and information relating to genset use and any other data the BMM requires to determine when to engage a respective battery.

In various embodiments, paralleling architecture enables second use and newer Li-ion batteries to support different continuous and peak-load demands, and control the charge/discharge rate according to the demand load and the power threshold set for the second-use and newer Li-ion batteries. The paralleling architecture prevents cell charge equalization and enables more accurate SOC predictions. Paralleling will prolong the battery life of both second use and first use Li-ion batteries based on the C-rates and cycling control, will enable more accurate temperature control of second use and first use Li-ion batteries and reduce the parasitic load of active thermal management.

Generally, using a SoH threshold, the exemplary method comprises determining whether a battery is a first or second use battery. If the SoH is greater than the SoH threshold the battery is a first use battery and is a second use battery otherwise. Even more generally, the SoH can be based on the SOC only, in which case an SOC threshold is used to distinguish between first and second use batteries. The batteries are diagnosed so the power system knows how many first and second use batteries there are and also knows the amount of energy available from them when they are fully charged. The power system may anticipate demand without a master load manager. Energy storage is modular. The energy storage modules are integrated and the load demand is communicated between them. Communications may comprise comparing the SoH of a module to the SoH of the other modules. Modules can be grouped into a first group comprising first use batteries and a second group comprising second use batteries. The SoH comparisons identify the modules with the higher SoH. In one example the modules are ordered based on SoH. The batteries from the first group with the highest SoH will be used first. When the SOC of batteries from the first group falls below a threshold, batteries from the second group are connected to supply energy. If load demand continues, batteries from the first and second groups will discharge sufficiently to trigger a charging cycle. In one variation, only data from the first group is used to trigger a charging cycle. Therefore data from the first group is used to engage the second group and to generate power without using data about the second group.

Figure 2:
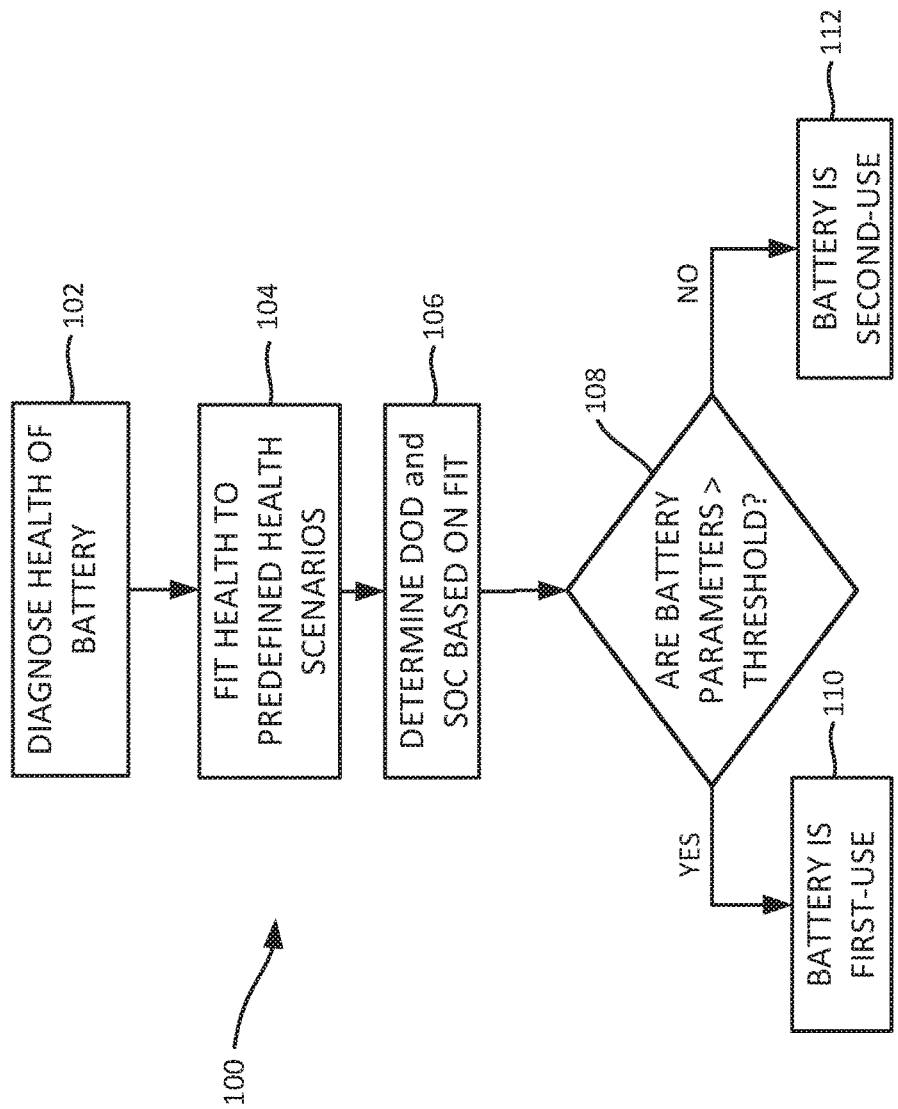
FIG. 2 is a flowchart of an embodiment of a method for determining if a battery is a second use battery.

FIG. 2 is a flowchart 100 of an embodiment of a method to determine if a battery is a second use battery. The method addresses the fact that the history of batteries may not be known. If the history is known then the health may be determined from the history data. At 102, the health of the second use battery is diagnosed to characterize its performance. At 104, the health is compared to predefined health scenarios and one of the scenarios is selected based on fit. Fit may be determined by determining an error based on the comparisons to the different scenarios and selecting the scenario with the least error.

At 106, depth of discharge and state of charge are determined based on the scenario selected from the fitting step.

At 108, depth of discharge and state of charge are compared to thresholds and a determination is based on the comparison. If, at 110, the parameters exceed the thresholds, then the battery is deemed a first use battery. If, at 112, the parameters do not exceed the thresholds, then the battery is deemed a second use battery.

Figure 3:
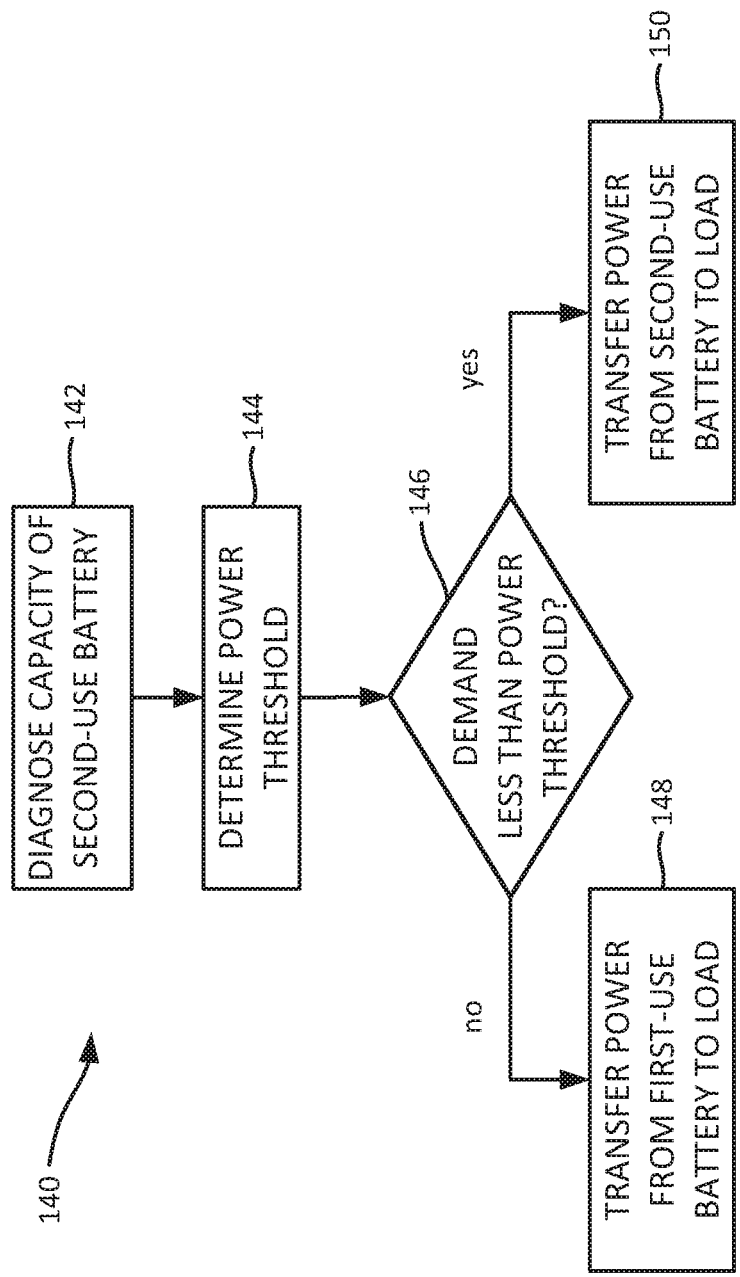
FIG. 3 is a flowchart of an embodiment of a method for determining when to engage a second use battery.

FIG. 3 is a flowchart 140 of an embodiment of a method for determining whether to discharge a first use or a second use battery to supply the load. At 142, the capacity of the second use battery is diagnosed if it is unknown. At 144, a power threshold is determined based on the capacity. At 146, the demand is compared to the power threshold. At 148, if demand exceeds the power threshold, then power is transferred from the first use battery to the load. Transferring power discharges the first use battery. At 150, if demand does not exceed the power threshold, then power is transferred from the second use battery to the load. The power threshold may be determined to ensure that the second use battery is not discharged quickly, which would occur if demand exceeds the power threshold, thereby extending the life of the second use battery.

Figure 4:
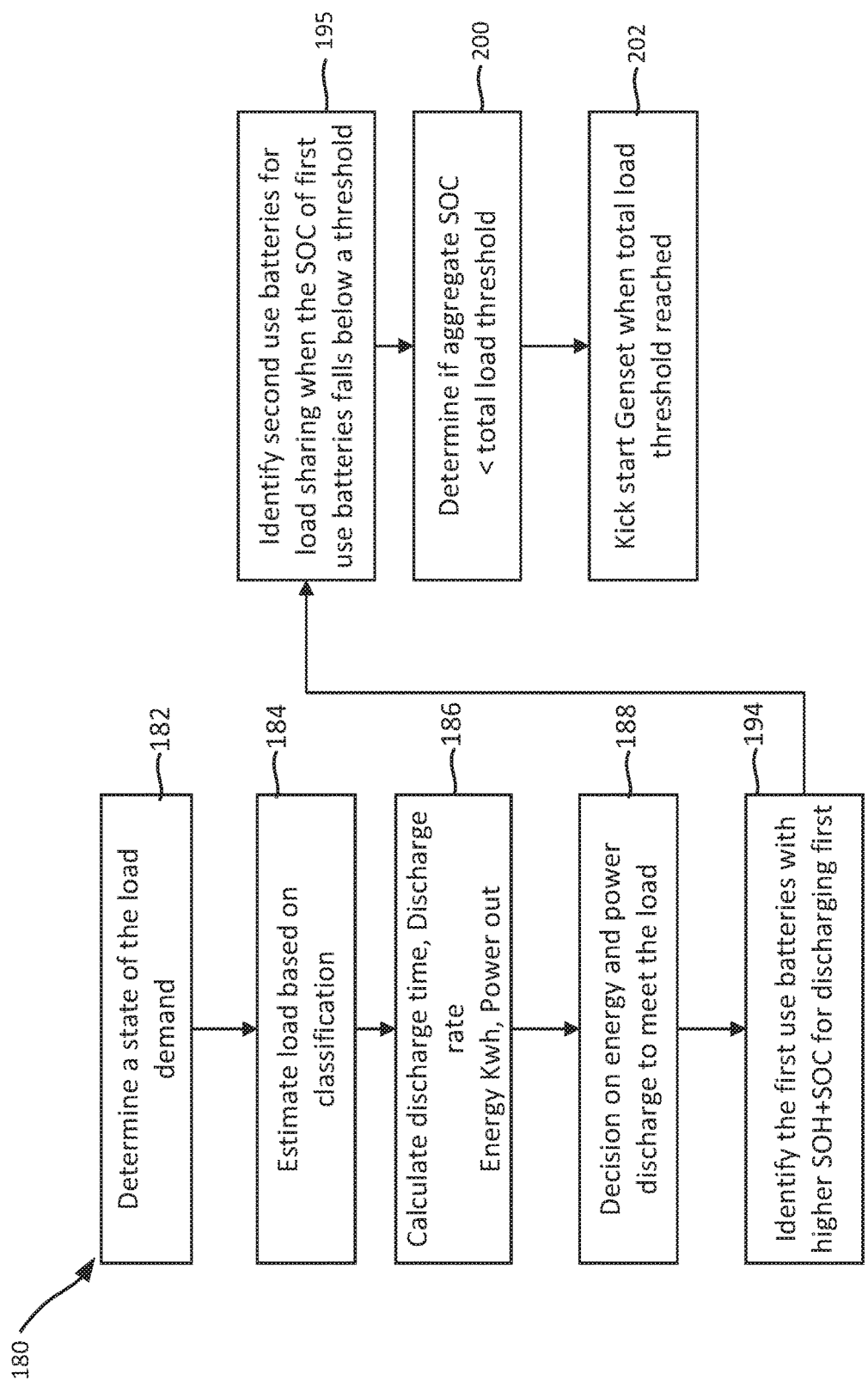
FIG. 4 is a flowchart of an embodiment of a method for determining when to engage a generator set connected to the batteries.

FIG. 4 is a flowchart 180 of an embodiment of a method for discharging a second use battery under steady-state or transient conditions and for determining when to engage the gensets. At 182, the state of the load demand is determined. The load demand state can be determined by analyzing the power usage, duty cycle, and other historical parameters, to characterize demand by the load over time and distinguish transient from steady-state demand. Generally, steady-state demand is demand that requires voltage and current within a band for an observation period, the width of the band determinable based on the historical data. If demand is not steady-state it is transient. Generally, transient demand is demand that requires voltage and current that fluctuate outside a band for an observation period. Transient demand may include demand that is increasing or decreasing over the observation period. The outcome is a determination of whether the load is in a transient state or steady-state.

At 184, the load demand is estimated based on the classification of the state of the load.

Based on the estimated load demand, which is based on the state, at 186, various parameters related to battery discharge controls are determined. These may include discharge time, discharge rate, energy and power out. Then, at 188, a decision is made regarding the energy and power that is to be discharged to meet the load demand. The decision may be communicated between the batteries, e.g. the BMM module corresponding to the battery, and the control modules associated with each genset.

At 194, the first use batteries with highest SOH and SOC are identified to supply the energy and power.

At 196, the first use batteries with highest SOH and SOC are identified to supply the energy and power.

At 198, the second use batteries with highest SOH and SOC are identified to supply the energy and power in a load sharing arrangement when the SOC of the first use batteries falls below a threshold. Thereby first and second use batteries supply the energy and power to the load.

Meanwhile, at 200, the aggregate SOC of the batteries is compared to a total load threshold equal to the aggregate battery recharge load plus the load demand. The battery recharge load is the load that must be satisfied to recharge the batteries to a desirable SOC, which may approximate the capacity of each battery. The total load threshold serves to determine when the gensets may be engaged to supply the load and also recharge the batteries. Of course not all the batteries must be recharged simultaneously.

At 202, the gensets are started when the total load threshold exceeds the aggregate SOC.

Figure 5:
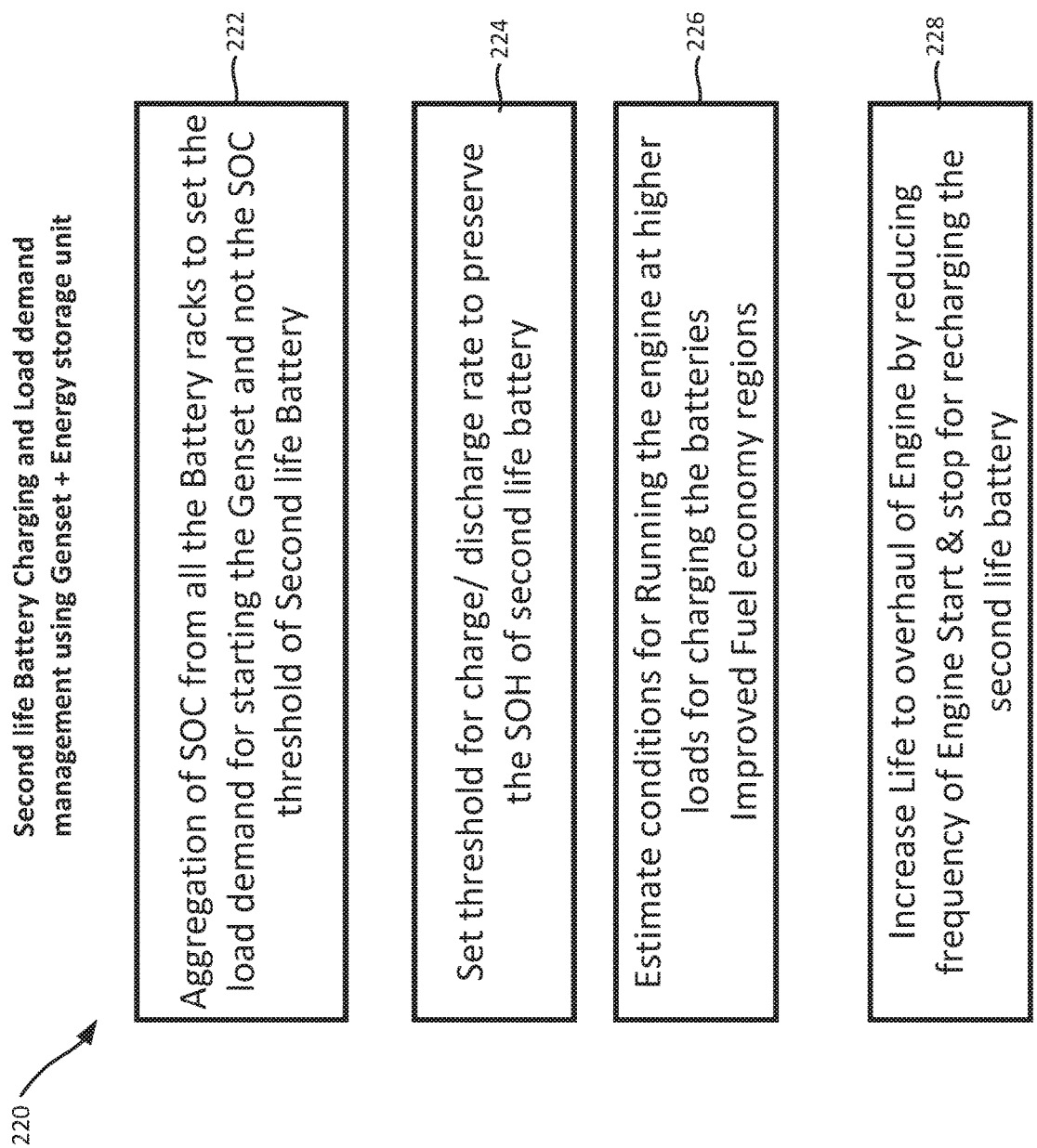
FIG. 5 is a flowchart of an embodiment of a method for determining when to engage a generator set connected to the batteries to minimize the start/stop frequency of the generator set.
Figure 6:
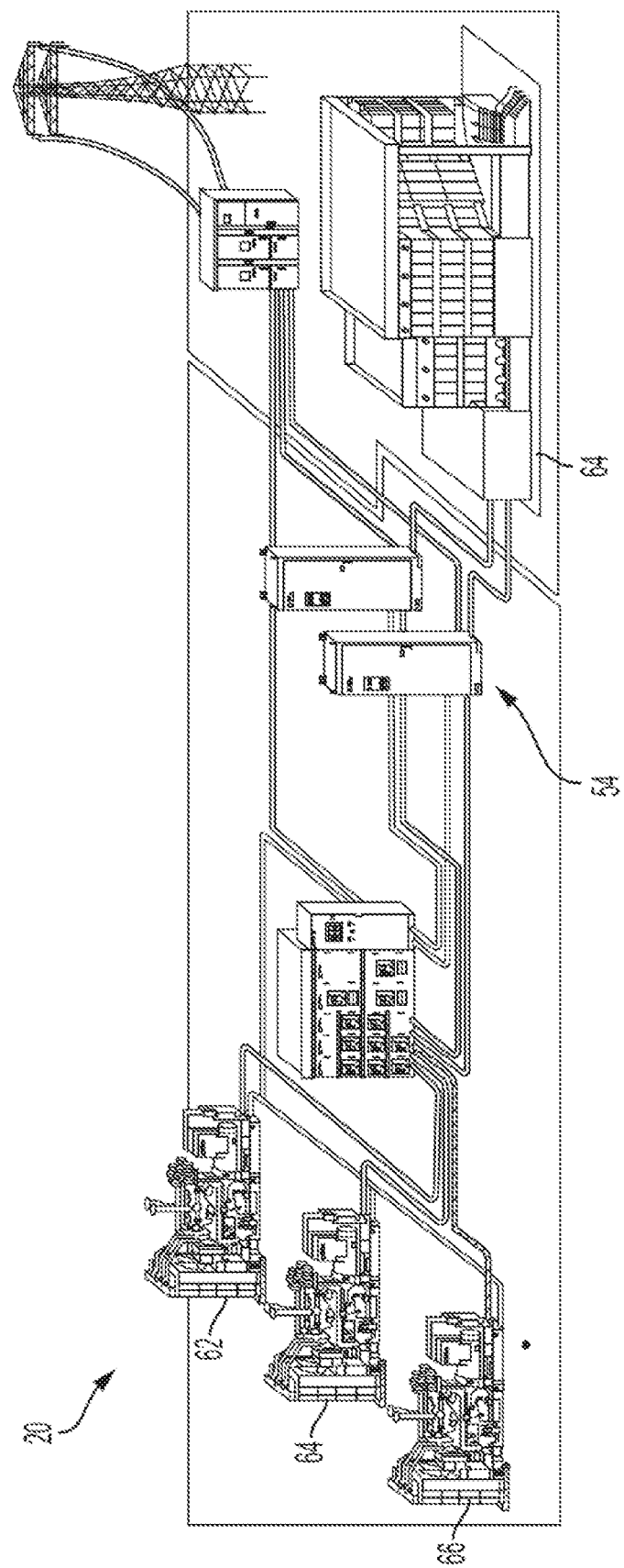
FIG. 6 is a perspective view of the power system of FIG. 1.
Figure 7:
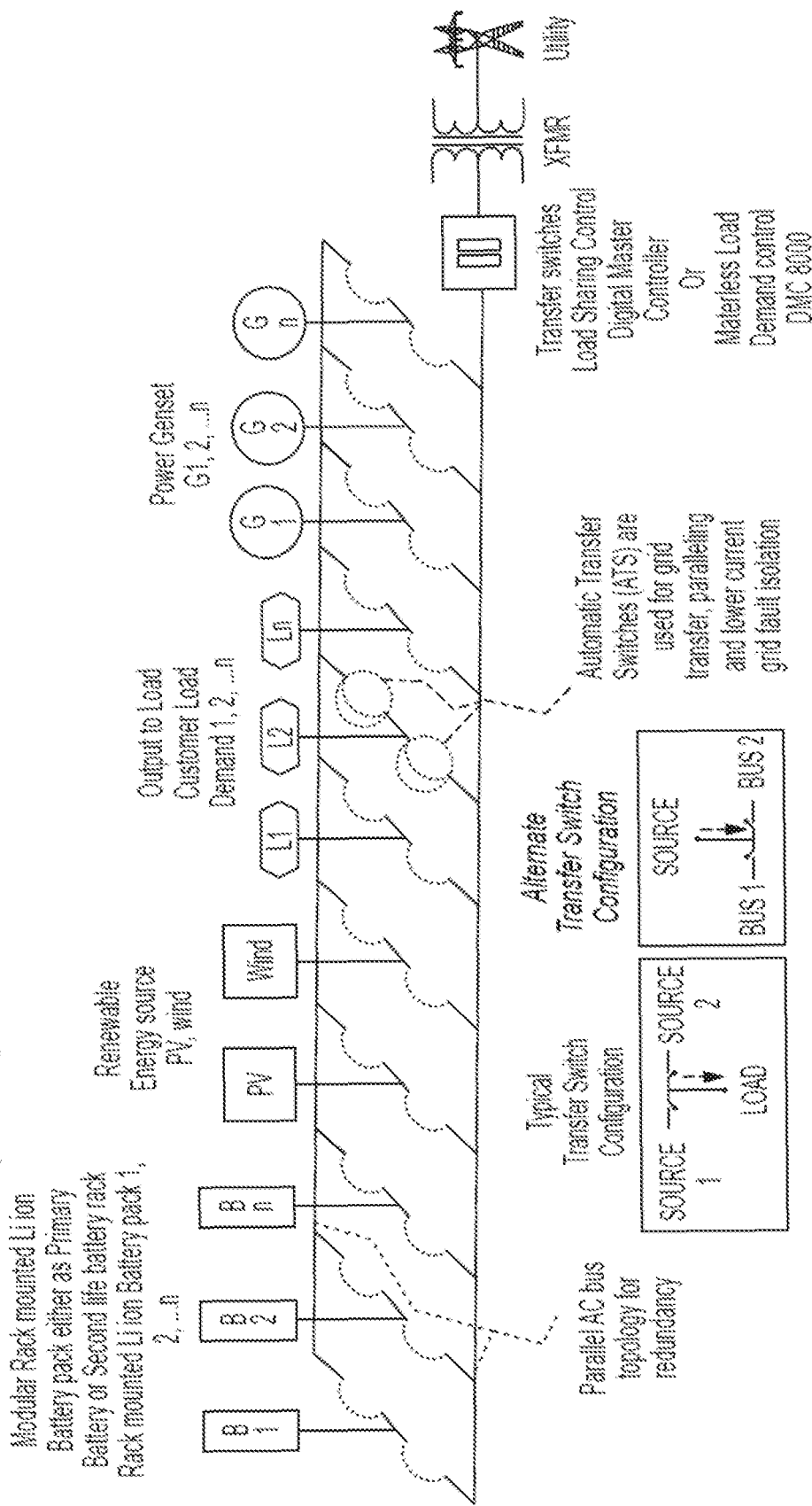
FIG. 7 is a diagram representing the power system of FIG. 1.

FIG. 5 is a flowchart of an embodiment of a method 220 for determining when to engage a generator set connected to the batteries to minimize the start/stop frequency of the generator set. The method includes:

At 222, the method begins with aggregation of SoC from all the battery racks to set the load demand for starting the Genset. Aggregation may be performed by a battery module or the digital master controller. The load demand for starting the Gensets may represent, for a given system, the proportion of the load demand which cannot be serviced by the batteries without operating them at disfavored SoH or SoC.

At 224, the method continues with setting thresholds for charge/discharge rates to preserve the SoH of second life batteries. Thresholds may also be set before aggregation of SoCs.

At 226, the method continues with estimating conditions for running the engines of the Gensets at higher loads for charging the batteries. The conditions may include the charge/discharge rates of the second life batteries, to enhance their longevity. The aggregated SoC is used to determine when the batteries are low and need charging, and the charge rates are used to add enough load to the Gensets to charge batteries at the appropriate rate.

At 228, the frequency of engine start and stop for recharging the second life batteries is reduced, as a result of increasing the life of the second use batteries as described above, therefore not requiring as many starts as would otherwise be required.

Figure 8:
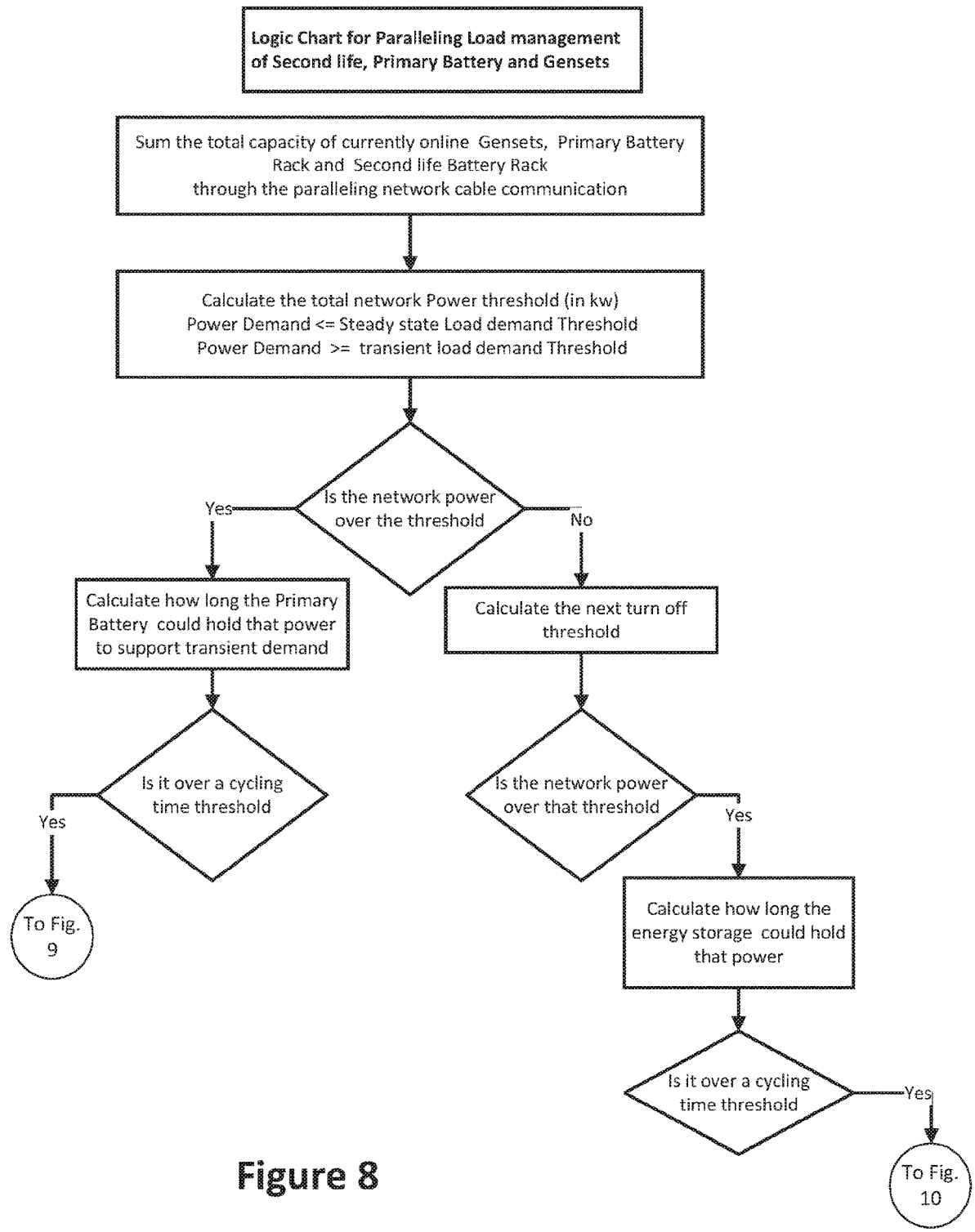
FIGS. 8-10 are flowcharts of an embodiment for determining cycling time for second use batteries.
Figure 9:
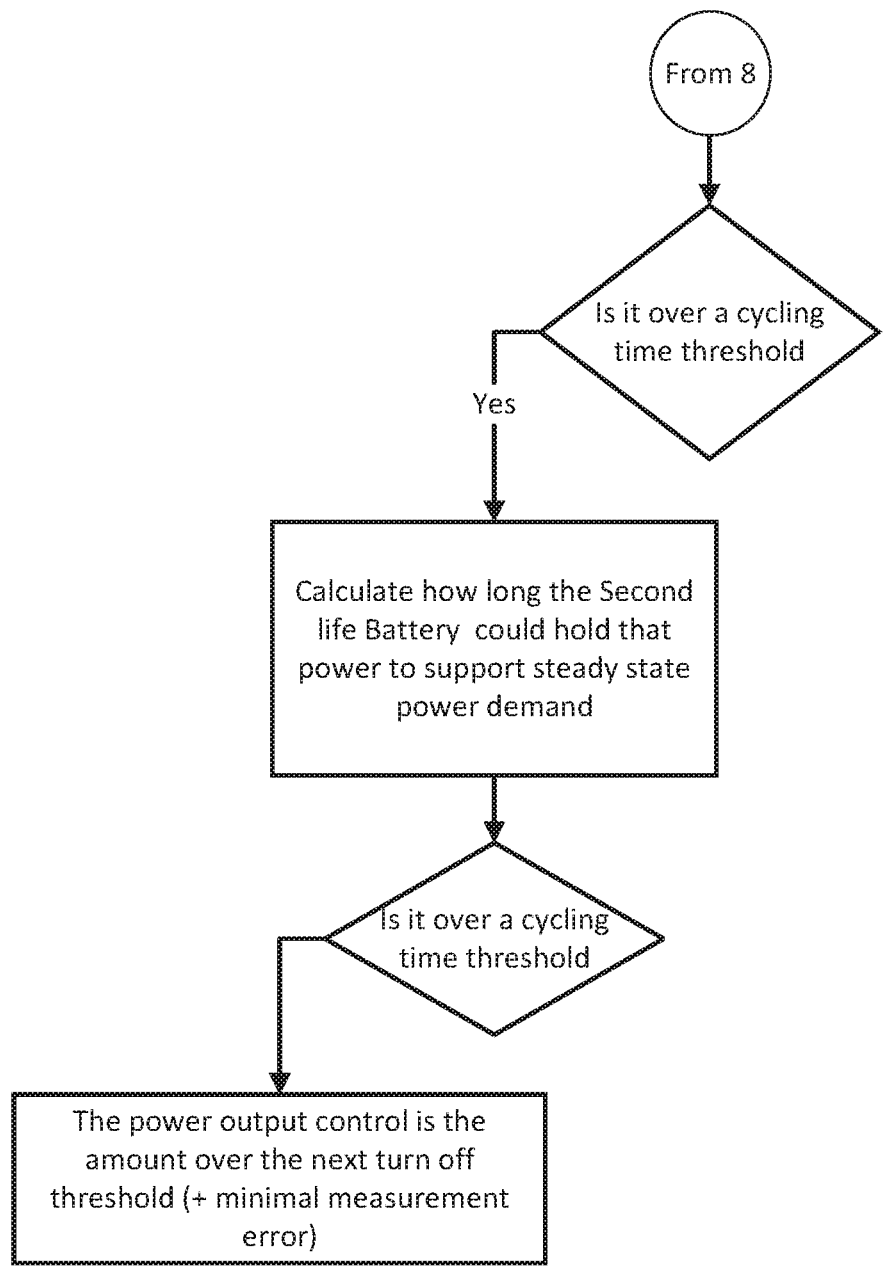
Figure 10:
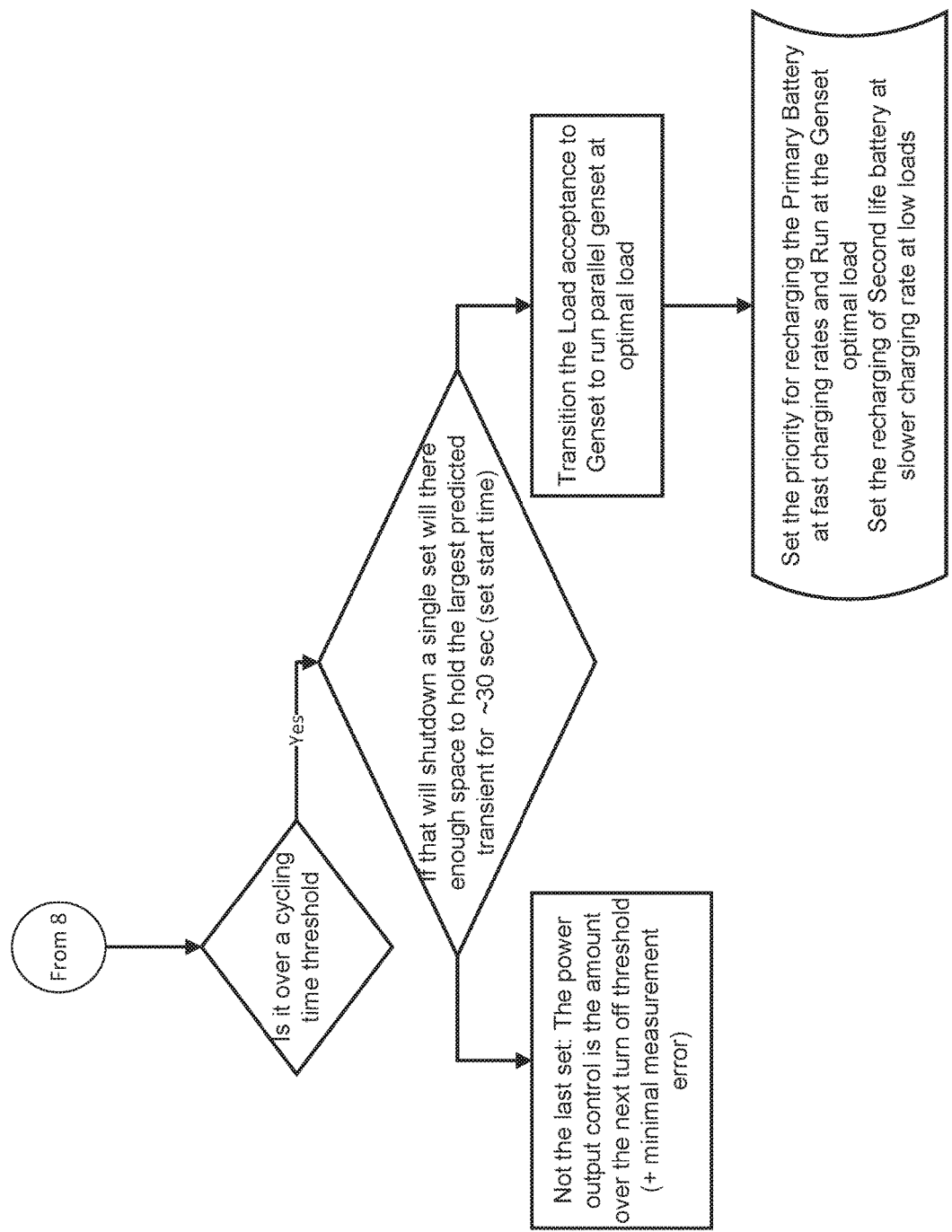

FIGS. 8-10 are flowcharts of an embodiment for determining cycling time for second use batteries.

The scope of the invention is to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B or C may be present in a single embodiment; for example, A and B, A and C, B and C, or A and B and C.

In the detailed description herein, references to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment.

As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

The embodiments and examples described above may be further modified within the spirit and scope of this disclo-

What is claimed is:

1. A method of using second use batteries, the method comprising:
communicating an external load demand to battery management modules (BMMs) of first use batteries and second use batteries;
communicating, by each of the BMMs, the state of health (SoH) of the respective first use battery or second use battery to the other BMMs;
by the BMMs of the first use batteries with a highest SoH, engaging the first use batteries to meet the external load demand, wherein the highest SoH is determined by the BMMs by ranking the SoH of each battery relative to the other batteries; and
by the BMMs of the second use batteries, setting a discharge limit for each of the second use batteries based on the SoH of the respective second use battery, and controlling the second use batteries to supply currents not to exceed the discharge limits of the respective second use batteries to load-share with the first use batteries.

2. The method of claim 1, wherein controlling the second use batteries to supply currents not to exceed the discharge limits of the respective second use batteries comprises the BMMs of the second use batteries engaging the second use batteries responsive to determining that the engaged first use batteries reached an aggregate state of charge below a threshold.

3. The method of claim 1, further comprising, by a BMM connected to an additional or replacement battery, conducting a battery diagnostics test to determine the SoH of the additional or replacement battery, and characterizing the additional or replacement battery as a first use battery or a second use battery.

4. The method of claim 3, further comprising, charging the first use batteries with a generator-set coupled to power the external load when an efficiency of the generator-set exceeds an efficiency threshold and not otherwise.

5. The method of claim 4, further comprising disengaging the generator-set when the efficiency is less than the efficiency threshold irrespective of a state of charge of the second use batteries.

6. The method of claim 5, further comprising engaging the generator-set to power the external load when the power supplied by the first use batteries exceeds an amount of power which, when provided by the generator-set, would cause the generator-set to operate at an efficiency greater than the efficiency threshold.

7. The method of claim 6, wherein engaging the generator-set is performed irrespective of the state of charge of the second use batteries.

8. The method of claim 4, wherein charging the first use batteries with a generator-set coupled to power the external load when an efficiency of the generator-set exceeds an efficiency threshold and not otherwise is performed when the efficiency of each generator-set coupled to power the external load is above the efficiency threshold.

9. The method of claim 4, wherein engaging the first use batteries to meet the external load demand comprises coupling the first use batteries and the generator-set to load-share, wherein load-share comprises supplying an amount of power to the external load, jointly by the first use batteries and the generator set, equal to the external load demand.

10. The method of claim 9, wherein coupling the generator-set to load-share with the first use batteries is performed irrespective of a state of charge of the second use batteries.

11. The method of claim 1, wherein engaging the first use batteries to meet the external load demand comprises coupling the first use batteries to supply an amount of power to the external load sufficient to prevent operation of a generator-set to supply power to the external load if the generator-set would thus operate below an efficiency threshold.

12. The method of claim 1, wherein engaging the first use batteries to meet the external load demand comprises coupling the first use batteries to supply an amount of power to the external load sufficient to prevent operation of a generator-set to supply power to the external load if the generator-set would thus operate below an efficiency threshold.

13. The method of claim 1, wherein load-sharing comprises engaging the second use batteries and the first use batteries to supply an amount of power to the external load equal to the external load demand.

14. A battery management system comprising:
a plurality of battery management modules (BMMs) communicatively coupled to each other to receive an indication of an external load demand and to respective first use batteries and second use batteries;
each of the plurality of BMMs including a controller configured to transmit, to the other of the plurality of BMMs, a state of health (SoH) of a first use battery or second use battery connected to the BMM;
wherein the controller is configured to determine, from among a plurality of BMMs based on respective states of health (SoH) of the batteries connected to the BMMs, if the battery connected to the BMM has a higher SoH than other batteries connected to the other of the plurality of BMMs and if so, to engage the battery to supply power to the external load demand.

15. The battery management system of claim 14, wherein the controllers connected to the second use batteries are configured to set discharge limits for each of the second use batteries based on the SoH of the respective second use battery, and are configured to control the second use batteries to supply currents not to exceed the discharge limits of the respective second use batteries to load-share with the first use batteries.

16. The battery management system of claim 15, wherein to control the second use batteries to supply currents not to exceed the discharge limits of the respective second use batteries the controllers are configured to engage the second use batteries responsive to determining that the engaged first use batteries reached an aggregate state of charge below a threshold.

17. The battery management system of claim 14, further comprising, by a BMM connected to an additional or replacement battery, conducting a battery diagnostics test to determine the SoH of the additional or replacement battery, and characterizing the additional or replacement battery as a first use battery or a second use battery.

* * * * *